(12) United States Patent
Nakajima et al.

(10) Patent No.: US 6,173,990 B1
(45) Date of Patent: Jan. 16, 2001

(54) INTERIOR EQUIPMENT MOUNTING STRUCTURE FOR A VEHICLE INCORPORATING HEAD-PROTECTING AIR BAG BODY

(75) Inventors: Hiroki Nakajima, Nagoya; Toshimitu Watanabe, Okazaki, both of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/159,782

(22) Filed: Sep. 24, 1998

(30) Foreign Application Priority Data

Sep. 26, 1997 (JP) .................................................. 9-261742

(51) Int. Cl.[7] .............................. B60R 21/22; B60R 7/04; B60N 3/02
(52) U.S. Cl. ...................... 280/730.2; 280/751; 296/214
(58) Field of Search ............................. 280/730.2, 730.1, 280/751; 296/214

(56) References Cited

U.S. PATENT DOCUMENTS

| | | | |
|---|---|---|---|
| 5,265,903 | * 11/1993 | Kuretake et al. ................. | 280/730.2 |
| 5,322,322 | 6/1994 | Bark et al. . | |
| 5,462,308 | 10/1995 | Seki et al. . | |
| 5,480,181 | 1/1996 | Bark et al. . | |
| 5,540,459 | 7/1996 | Daniel . | |
| 5,588,672 | 12/1996 | Karlow et al. . | |
| 5,605,346 | 2/1997 | Cheung et al. . | |
| 5,660,414 | 8/1997 | Karlow et al. . | |
| 5,791,683 | * 8/1998 | Shibata et al. ..................... | 280/730.2 |
| 5,988,673 | * 11/1999 | Stavermann ....................... | 280/730.1 |
| 6,073,961 | * 6/2000 | Bailey et al. ...................... | 280/730.2 |
| 6,079,735 | * 6/2000 | Fallmann et al. ................. | 280/730.2 |

FOREIGN PATENT DOCUMENTS

| | | | |
|---|---|---|---|
| 27 35 531 | * 2/1979 | (DE) | ................................... 280/751 |
| 6-227340 | 8/1994 | (JP) . | |
| 9-207701 | 8/1997 | (JP) . | |
| 96/26087 | 8/1996 | (WO) . | |

* cited by examiner

Primary Examiner—Peter C. English
(74) Attorney, Agent, or Firm—Pillsbury Madison & Sutro LLP

(57) ABSTRACT

During a collision, an air bag causes deformation of a roof head lining as the air bag expands. A roof head lining deformation limiting structure restricts inward deformation of the roof head lining. Thus, the roof head lining is prevented from interfering with an interior equipment, e.g., a sun visor, thereby reducing breakage of the sun visor provided adjacent the roof head lining. The deformation limiting structure can take the form of an assist grip or a card holder. Also, the assist grip or the card holder can be mounted onto a member, e.g., a bracket, that plastically deforms upon being struck by the occupant's head during a collision, thereby absorbing a portion of the impact that would otherwise be transferred to the occupant.

18 Claims, 9 Drawing Sheets

INTERIOR EQUIPMENT MOUNTING STRUCTURE FOR A VEHICLE INCORPORATING HEAD-PROTECTING AIR BAG BODY

BACKGROUND OF THE INVENTION

1. Field of the Invention

The present invention relates to an interior equipment mounting structure for a vehicle incorporating a head-protecting air bag body, wherein a head-protecting air bag body accommodated along a pillar portion and a roof side rail portion unfolds similarly to a curtain due to gas jetted by an inflator when a predetermined high load acts on a side portion of a vehicle body.

2. Description of the Related Art

There has been proposed a head-protecting air bag device in which, in order to improve the ability to protect the head of a vehicle occupant seated in a front seat when a predetermined high load acts on a side portion of a vehicle body, an air bag body accommodated in a folded state over a region from a front pillar portion to a roof side rail portion is caused to unfold along a side window glass similarly to a curtain. This type of head-protecting air bag device is disclosed in International Publication No. WO 96/26087 and will be described hereinafter.

As shown in FIG. 9, a head-protecting air bag device 100 is structured to include, as main components, an elongated duct 106 disposed to extend from a front pillar portion 102 to a roof side rail portion 104, an air bag body 112 accommodated in the duct 106 in a folded manner and fixed to a vehicle body at a front-end fixed point 108 and at a rear-end fixed point 110, an inflator 116, which is connected via a hose 114 to the rear end of the duct 106 and jets out gas when a predetermined high load acts on the side portion of the vehicle body, and a band-shaped strap 118 whose one end is fixed to the vehicle body and other end is fixed to the rear end of the air bag body 112. The air bag body 112 is formed by a plurality of cells 120, which are each formed substantially into a cylinder and are disposed with the longitudinal directions thereof substantially coinciding with the vertical direction of the vehicle, being connected together.

According to the above-described structure, when a predetermined high load acts on the side portion of the vehicle body, gas is ejected from the inflator 116. The ejected gas flows into each cell 120 of the folded air bag body 112 via the hose 114 and the duct 106. As a result, each cell 120 expands substantially into a cylindrical configuration with the longitudinal direction thereof substantially coinciding with the vertical direction of the vehicle. The air bag body 112 is thereby inflated similarly to a curtain along a window glass 122. Further, the rear end of the air bag body 112 is connected via the strap 118 to the vehicle body, and therefore, the rear-end side of the air bag body 112 is reliably disposed at an inner side of the upper portion of a center pillar portion 124.

However, in this head-protecting air bag device 100, the air bag body 112 accommodated in the duct 106 in a folded state is disposed over a region from the front pillar portion 102 to the roof side rail portion 104, and therefore, the air bag body 112 is covered by, for example, a front pillar garnish and a roof head lining. As a result, when the air bag body unfolds, the front pillar garnish and the roof head lining deform, and the air bag body comes out from the respective deformed portions of the front pillar garnish and the roof head lining so as to expand toward the interior side of the vehicle. For this reason, in a case in which a sun visor or other interior equipment is provided in the vicinity of the front pillar garnish or the roof head lining, there is the possibility that the deformed portion of the front pillar garnish or the deformed portion of the roof head lining interferes with the sun visor or the other interior equipment such that the sun visor or other interior equipment is badly damaged due to the large load applied thereto.

SUMMARY OF THE INVENTION

In view of the above-described circumstances, it is an object of the present invention to provide an interior equipment mounting structure for a vehicle incorporating a head-protecting air bag body, which can reduce damage caused to a sun visor or other interior equipment during expansion of an air bag body.

A first aspect of the present invention relates to a sun visor which is provided as an interior equipment mounting structure for a vehicle incorporating a head-protecting air bag body which unfolds and forms an air-filled cushion in a region from a front pillar to a roof side rail. The sun visor is connected to a vehicle body via an arm and provided to be movable from an accommodated state, in which the sun visor is disposed along a vehicle transverse direction and near to a front end of a roof head lining and substantially parallel to the roof head lining, to at least one predetermined position for use. The sun visor is formed by a main body portion, which is, in the accommodated state of the sun visor, disposed further toward a vehicle-interior side than a point at which the arm is mounted to the vehicle body, and by an overhang portion which is, in the accommodated state of the sun visor, projects further toward a vehicle-exterior side than the mounting point of the arm, and when load of a predetermined value or more acts on the overhang portion, the overhang portion is easily deformable with respect to the main body portion.

Accordingly, even if, at the time of expansion of the air bag body, the roof head lining deforms and interferes with the overhang portion of the sun visor which is in an accommodated state, when the load acting on the overhang portion is greater than or equal to a predetermined value, the overhang portion easily deforms with respect to the main body portion. As a result, load transmitted to the main body portion and the arm of the sun visor can be minimized, and damage to the sun visor can thereby be reduced.

A second aspect of the present invention is that a frame of the sun visor according to the first aspect is divided into two parts, one part being at the overhang portion and the other part being at the main body portion, and the two separated parts are partially connected to one another.

Accordingly, when load of a predetermined value or more is applied to the overhang portion via the roof head lining during expansion of the air bag body, the portion at which the frames for the overhang portion and the main body portion are connected together breaks so that load transmitted to the main body portion and to the arm can be minimized. For this reason, damage to the sun visor can be reduced by using a simple structure.

A third aspect of the present invention relates to roof head lining deformation limiting means which is provided as an interior equipment mounting structure for a vehicle incorporating a head-protecting air bag body which expands similarly to a curtain in a region from a pillar to a roof side rail. The roof head lining deformation limiting means is provided at the roof side rail such that at the time of expansion of the air bag body, it restricts deformation of a roof head lining to reduce impact load acting on an interior equipment disposed in the vicinity of the roof head lining.

According to the third aspect of the present invention, deformation of the roof head lining is restricted by the roof head lining deformation limiting means during expansion of the air bag body, so that the impact load acting on the interior equipment disposed in the vicinity of the roof head lining can be reduced. Accordingly, damage caused to the sun visor or other interior equipment at the time of expansion of the air bag body can be reduced.

A fourth aspect of the present invention relates to the roof head lining deformation limiting means according to the third aspect. The roof head lining deformation limiting means is an interior equipment of the roof side rail, which interior equipment is disposed at an intermediate portion of the roof side rail between a portion where the roof side rail is connected to a front pillar and a portion where the roof side rail is connected to a center pillar.

As a result, in addition to the effect obtained by the third aspect, there is an advantage in that a reduction in cost can be achieved because no specially provided roof head lining deformation limiting means is required.

A fifth aspect of the present invention is that the interior equipment of the roof side rail according to the fourth aspect is fixed to an energy absorbing member disposed at the roof side rail, the energy absorbing member being associated with a corresponding energy absorption space.

As a result, in addition to the effect obtained by the fourth aspect, there is an advantage in that, even if the head of a vehicle occupant hits the interior equipment in a collision, the energy absorbing member plastically deforms to lessen the impact on the head of the vehicle occupant.

A sixth aspect of the present invention is that the interior equipment of the roof side rail according to the fourth aspect is an assist grip and a high rigidity seating is provided around a cushion which is made of resin and used to fix the assist grip to a vehicle body.

As a result, concentration of load at a fixing portion of the assist grip, which load concentration is caused by deformation of the roof head lining during expansion of the air bag body, can be received by a high rigidity seating so as to prevent transmission of load to the cushion made of resin. For this reason, damage to the cushion made of resin can be prevented.

A seventh aspect of the present invention is that the interior equipment of the roof side rail according to the fourth aspect is a card holder and the card holder is a resin molded product and includes a high rigidity insert.

As a result, concentration of load at a fixing portion of the card holder, which load concentration is caused by deformation of the roof head lining during expansion of the air bag body, can be received by a high rigidity insert. For this reason, damage to the card holder can be prevented.

DESCRIPTION OF THE PREFERRED EMBODIMENTS

A description will be hereinafter given of an interior equipment mounting structure for a vehicle incorporating a head-protecting air bag body according to a first embodiment of the present invention with reference to FIGS. 1 to 4.

It should be noted that arrows "FR", "UP", and "IN" shown in the accompanying drawings respectively represent the forward direction of a vehicle, the upward direction thereof, and an inward direction along the transverse direction of the vehicle.

Figure 4:
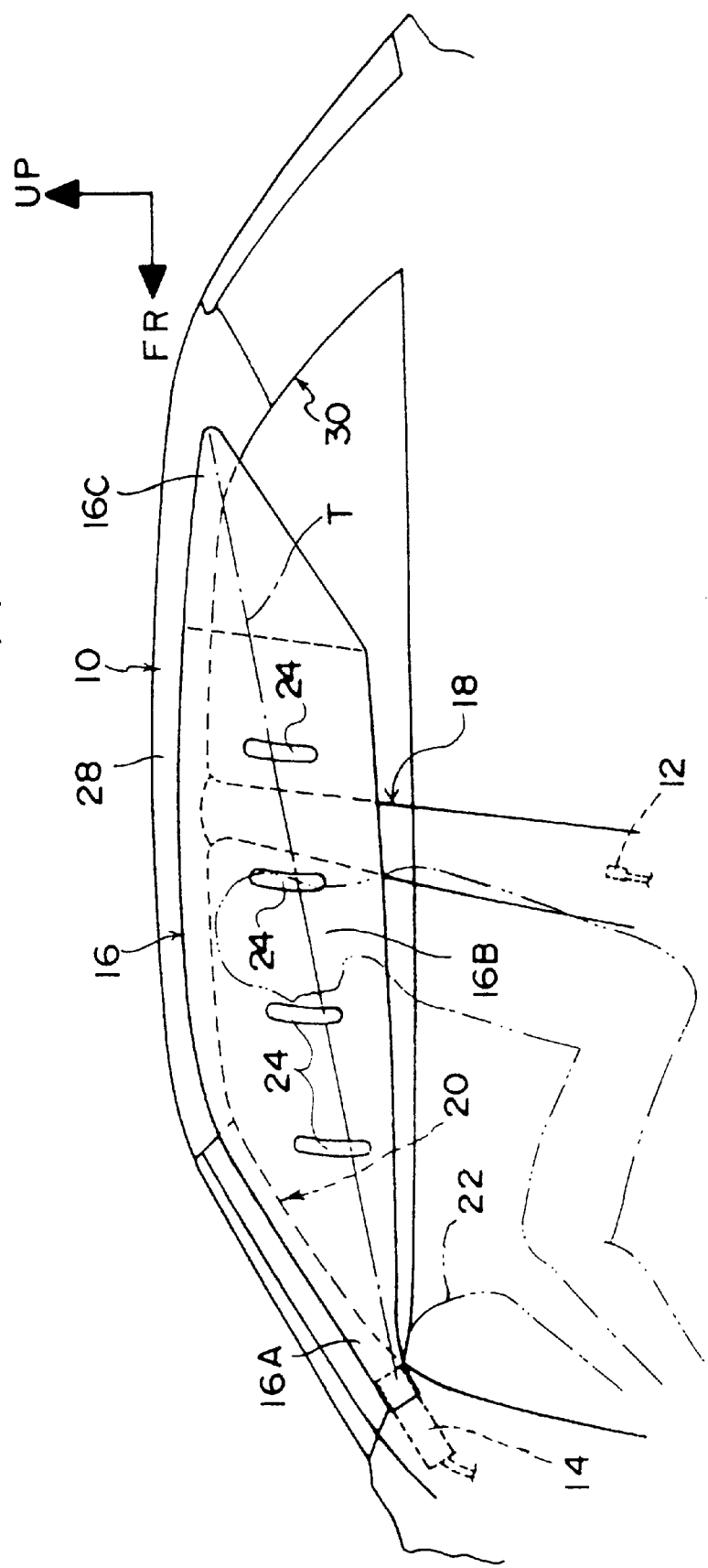
FIG. 4 is a side view which schematically shows a state in which expansion of an air bag body is completed at an interior-side surface of a vehicle at a driver's seat side, to which the interior equipment mounting structure for a vehicle incorporating a head-protecting air bag body according to the first embodiment of the present invention is applied.

As shown in FIG. 4, a head-protecting air bag device 10 of the present embodiment is structured to include, as main components, a sensor 12 for detecting the state of a side collision of the vehicle, a cylindrical inflator 14 which ejects gas upon operation thereof, and an air bag body 16. The sensor 12 is disposed in the vicinity of the lower end of a center pillar (B pillar) 18. When a side-collision load of a predetermined value or more acts on a side portion of a vehicle body, the sensor 12 detects the state of a side collision of the vehicle.

The inflator 14 is disposed near a portion where a front pillar (A pillar) 20 and an instrument panel 22 are jointed to one another, and is connected to the above-described sensor 12. Accordingly, when the state of a side collision of the vehicle is detected by the sensor 12, the inflator 14 is operated.

A plurality of non-expanding portions 24, whose longitudinal direction coincides with the vertical direction of the air bag body, are formed at predetermined intervals at a vertical direction intermediate portion of the air bag body 16 as seen in side view in such a manner as to cross a tension line T which connects a front-side fixed point and a rear-side fixed point of the air bag body 16. At the time of expansion of the air bag body, these non-expanding portions 24 allow formation of a plurality of cylindrical expanding portions which are disposed substantially parallel to one another and cross the tension line T.

The front end 16A of the air bag body 16 is disposed at a position where the inflator 14 is provided, so as to allow gas ejected from the inflator 14 to flow into the air bag body. An upper end edge of an intermediate portion 16B is disposed along the front pillar 20 and a roof side rail 28, and an upper end edge of the rear end 16C is disposed near a quarter pillar (C pillar) 30.

Figure 3:
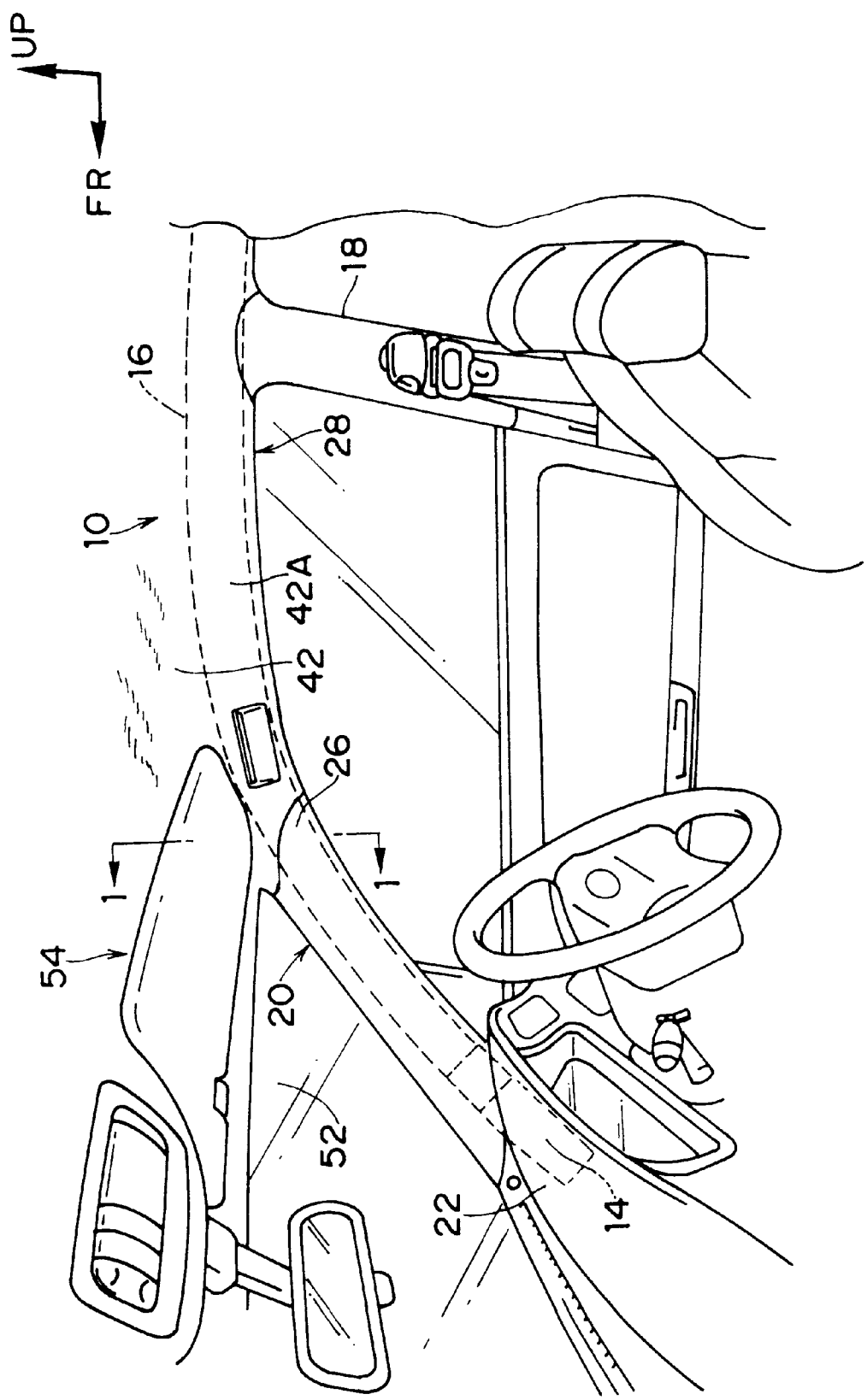
FIG. 3 is a side view which schematically shows an interior-side surface of a vehicle at a driver's seat side, to which the interior equipment mounting structure for a vehicle incorporating a head-protecting air bag body according to the first embodiment of the present invention is applied.

As shown in FIG. 3, the air bag body 16 is accommodated in a region from a front pillar garnish 26 to an outer side portion 42A of a roof head lining 42 in the transverse direction of the vehicle in such a manner as to be elongated by being folded in a bellows-like shape substantially in the vertical direction of the vehicle.

Figure 1:
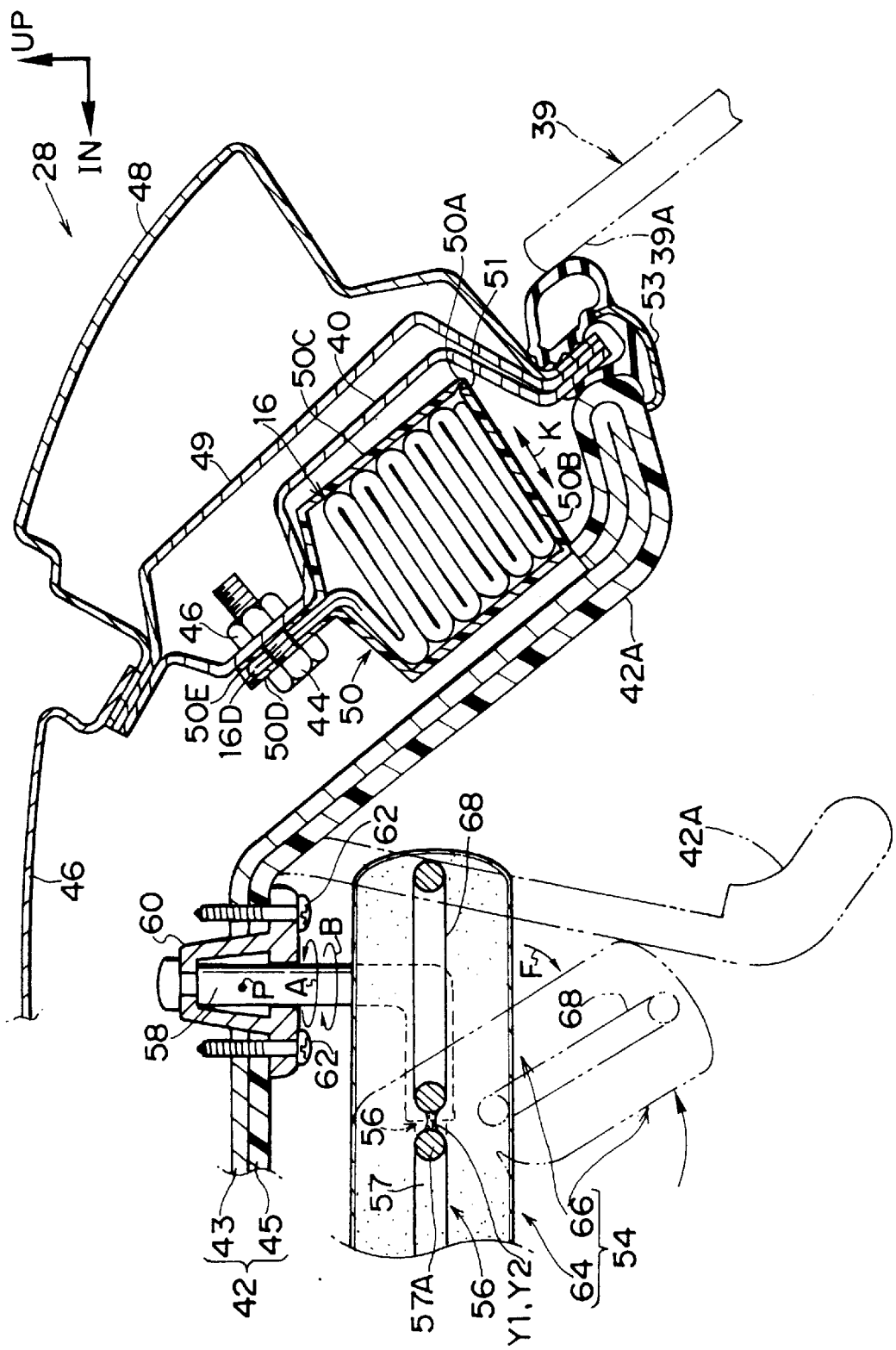
FIG. 1 is an enlarged sectional side view taken along line 1—1 in FIG. 3, which schematically shows an interior-side surface of a vehicle at a driver's seat side, to which an interior equipment mounting structure for a vehicle incorporating a head-protecting air bag body according to a first embodiment of the present invention is applied.

As shown in FIG. 1, the roof side rail 28 is formed by a rail outer panel 48 having a substantially hat-shaped cross-sectional configuration and projecting by a relatively large amount in the outward direction of the vehicle, a rail inner panel 40 which slightly projects toward the rail outer panel 48, and a rail reinforcement 49 having a substantially hat-shaped cross-sectional configuration along the rail outer panel 48 and interposed between the rail outer panel 48 and the rail inner panel 40. Respective ends of the rail outer panel 48, the rail inner panel 40, and the rail reinforcement 49 at the both sides thereof are joined together by welding to form a closed cross-sectional configuration. Further, the upper end of the roof side rail 28 thus formed is connected by welding to an outer end of a roof panel 46 in the transverse direction of the vehicle. An opening weather strip 53 is fitted to the lower end of the roof side rail 28.

The air bag body 16 is folded within a case 50 in a direction substantially perpendicular to an interior-side surface 39A of a door glass 39 (i.e., in the directions indicated by the double-headed arrow K in FIG. 1), and the case 50 is disposed between the rail inner panel 40 and the roof head lining 42. When the air bag body 16 expands, a corner portion 50A formed at the lower end of the case 50 at the outer side in the transverse direction of the vehicle is broken, due to the expansion force of the air bag body 16, with a V-shaped notch 51, which is formed further toward the inner side of the case 50 than the corner portion 50A, serving as a breakage starting point. As a result, a lid portion 50B opens toward the interior side of the vehicle with respect to a base portion 50C.

At this time, in the roof side rail 28, the lid portion 50B pushes the roof head lining 42 and the rail inner panel 40 apart from one another so that the clearance below the lid portion 50B and between the roof head lining 42 and the rail inner panel 40 (which clearance is usually closed by the weather strip 53) is widened, creating an opening from which the air bag body can expand toward the interior of the vehicle.

Further, in the case 50, an upper wall portion 50D of the lid portion 50B and an upper wall portion 50E of the base portion 50C are disposed parallel to each other with an upper end portion 16D of the air bag body 16 interposed therebetween. A through hole is formed in each of the upper wall portions 50D and 50E of the case 50. The case 50 is, together with the air bag body 16, fixed to an interior-side portion of the rail inner panel 40 by a bolt 44 penetrating the through holes formed in the upper wall portions 50D and 50E and a mounting hole formed in the upper end portion 16D of the air bag body 16, and also by a nut 46 which is screwed onto the bolt 44.

The roof head lining 42 is made of resin and is formed by a base material 43 and a surface cover 45. When the air bag body 16 expands, the vehicle transverse direction outer side portion 42A of the roof head lining 42 deforms, as indicated by the two-dot chain line in FIG. 1, toward the interior side of the vehicle due to the expansion force of the air bag body 16, and the air bag body 16 thereby expands from the opening toward the interior of the vehicle.

As shown in FIG. 3, a sun visor 54 is disposed above and near a front window 52 and is provided to be biaxially rotatable so as to be able to shut out sunlight coming from a transverse direction side of the vehicle as well.

As shown in FIG. 1, one end of an arm shaft 56 which forms one part of an arm of the sun visor 54 is connected to an L-shaped bent arm joint 58 which forms another part of the arm. One end of the arm joint 58 is supported at a bracket 60 such that the arm joint 58 rotates in inward directions substantially on a horizontal plane (i.e., the directions indicated by arrows A and B in FIG. 1). The bracket 60 is fixed to a header panel (not shown) by self-tapping screws 62.

Figure 2:
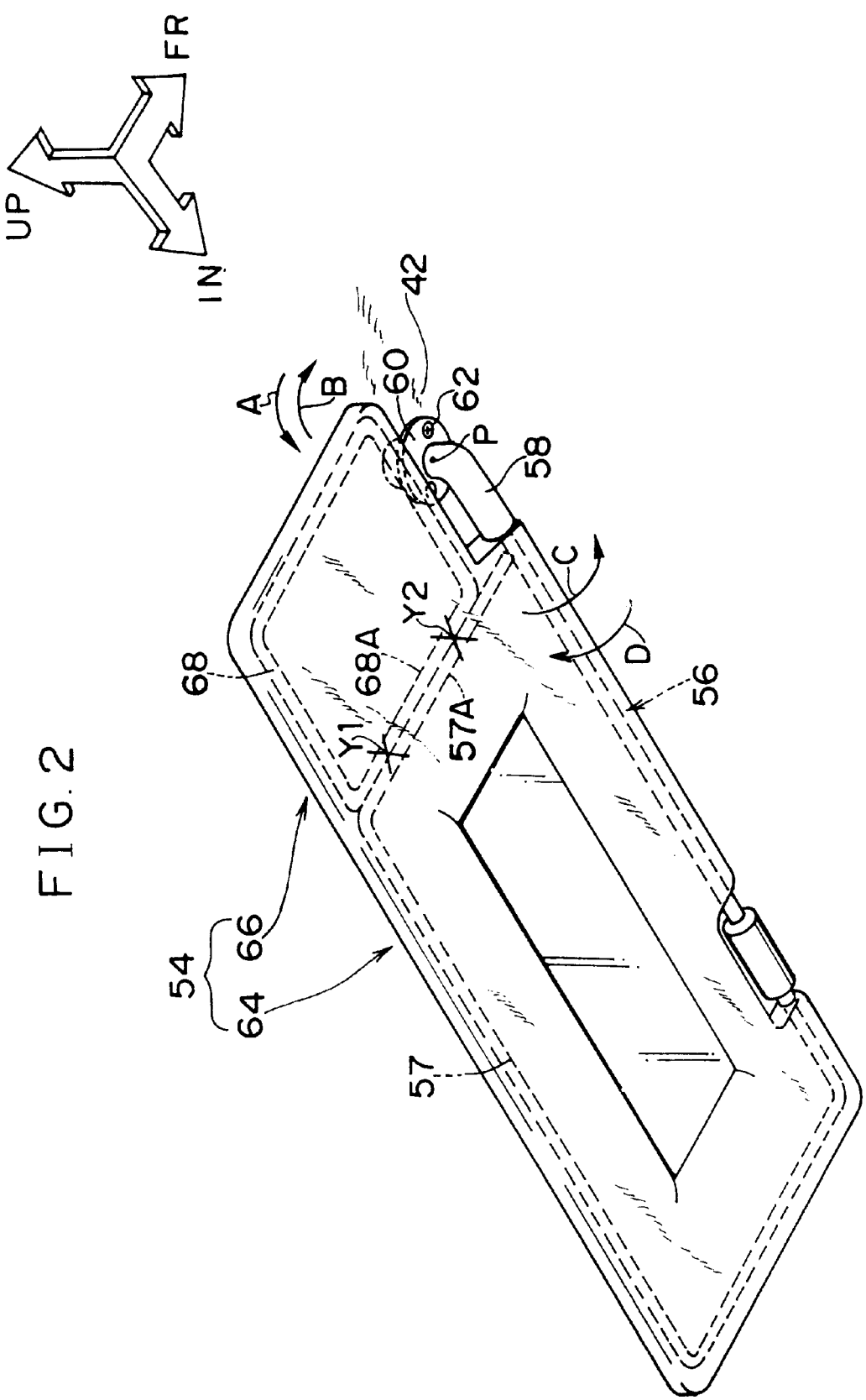
FIG. 2 is a perspective view, as seen from the inner rear side of a vehicle, which shows a sun visor of the interior equipment mounting structure for a vehicle incorporating a head-protecting air bag body according to the first embodiment of the present invention.

As shown in FIG. 2, the arm shaft 56 of the sun visor 54 is rotatably connected to the arm joint 58 such that the arm shaft 56 can rotate in inward directions on a vertical plane (i.e., the directions indicated by arrows C and D in FIG. 2). Further, the sun visor 54 is formed by a main body portion 64 in which the arm shaft 56 bent in a rectangular form is built-in as a frame 57 at a peripheral edge portion thereof, and an overhang portion 66 disposed at the side of the main body portion 64 and having a portion which projects further outward in the transverse direction of the vehicle than a point P at which the arm joint 58 is mounted to the roof head lining 42. A frame 68 bent into a rectangular shape is built-in at a peripheral edge portion of the overhang portion 66 and is fixed, at a side 68A adjacent to the main body portion 64, to a side 57A of the frame 57 at two welded portions Y1 and Y2 formed with a predetermined distance therebetween.

Accordingly, when a predetermined load or more acts on the overhang portion 66, the two welded portions Y1 and Y2 break, and as indicated by the two-dot chain line in FIG. 1, the overhang portion 66 easily deforms downward with respect to the main body portion 64 (i.e., in the direction indicated by arrow F in FIG. 1).

Next, operation of the present first embodiment will be described.

In the present first embodiment, when a side-collision load of a predetermined value or more acts on the side portion of the vehicle body, the occurrence of a side surface collision of the vehicle is detected by the sensor 12. The inflator 14 then operates to eject a predetermined amount of gas. As a result, the air bag body 16 starts to expand, and then further expands similarly to a curtain down to beneath the roof side rail 28 while pushing open the case 50 as well as the pillar garnish 26 of the front pillar 20 and the vehicle transverse direction outer side portion 42A of the roof head lining 42. The air bag body 16 is thus interposed between the side portion of the vehicle body and the head of the vehicle occupant to protect the head of the vehicle occupant.

In this case, as illustrated by the two-dot chain line in FIG. 1, when the vehicle transverse direction outer side portion 42A of the roof head lining 42 interferes with the overhang portion 66 of the sun visor 54 and a predetermined load or more acts on the overhang portion 66, the two welded portions Y1 and Y2, which are portions at which the frame 68 of the overhang portion 66 and the frame 57 of the main body portion 64 are connected, break, and the overhang portion 66 thereby easily deforms downward with respect to the main body portion 64 (i.e., in the direction indicated by arrow F in FIG. 1). For this reason, load applied from the air bag body 16 to the sun visor 54 is effectively absorbed and transmission of load to the main body portion 64, the arm shaft 56, and the arm joint 58 can be kept to a minimum. As a result, by using a simple structure, it is possible to limit the breakage of the sun visor 54 to merely the downward bending of the overhang portion 66 and also to prevent the sun visor 54 from coming off from the vehicle body.

Figure 5:
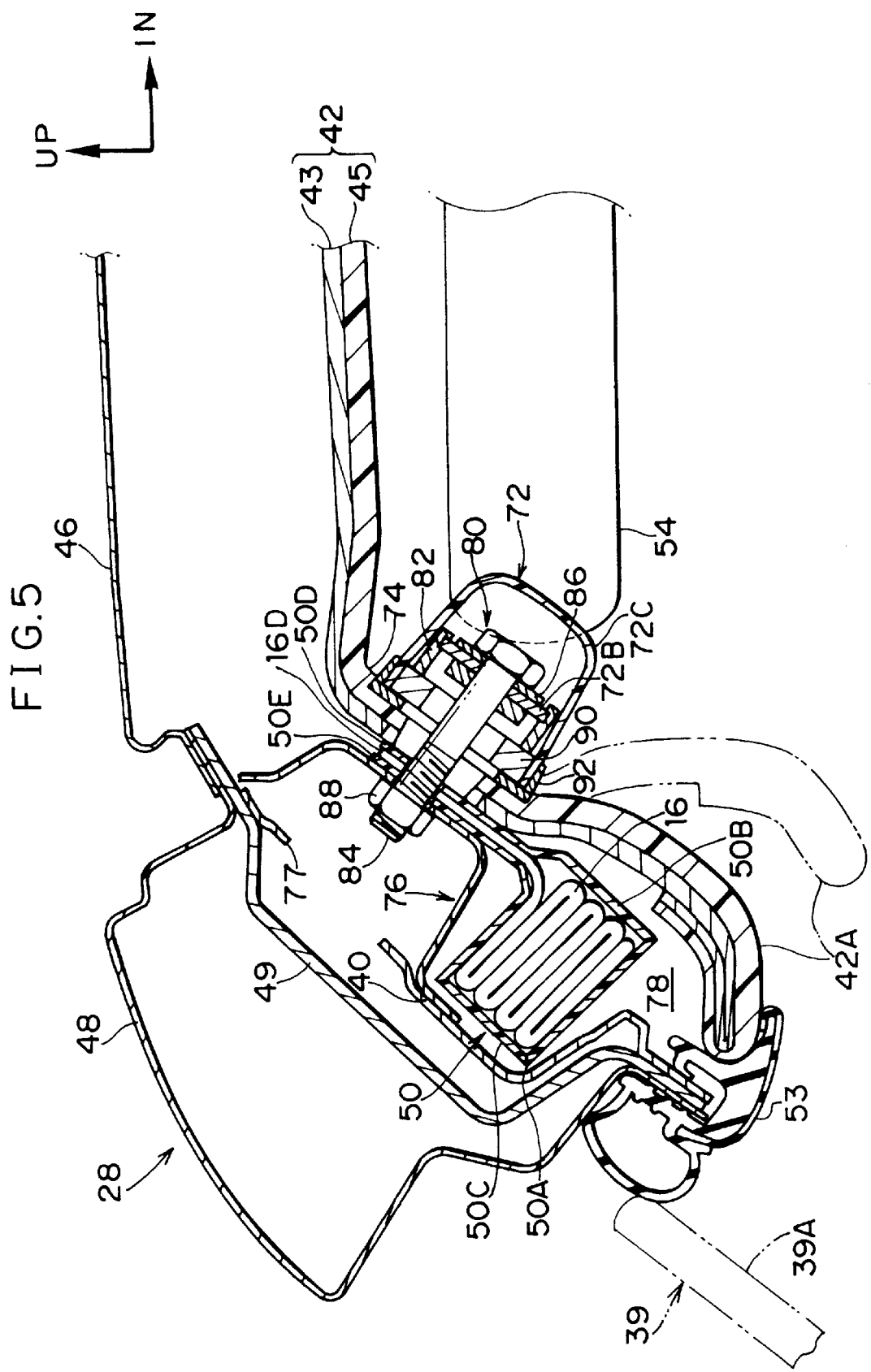
FIG. 5 is an enlarged cross-sectional view taken along line 5—5 in FIG. 6.
Figure 6:
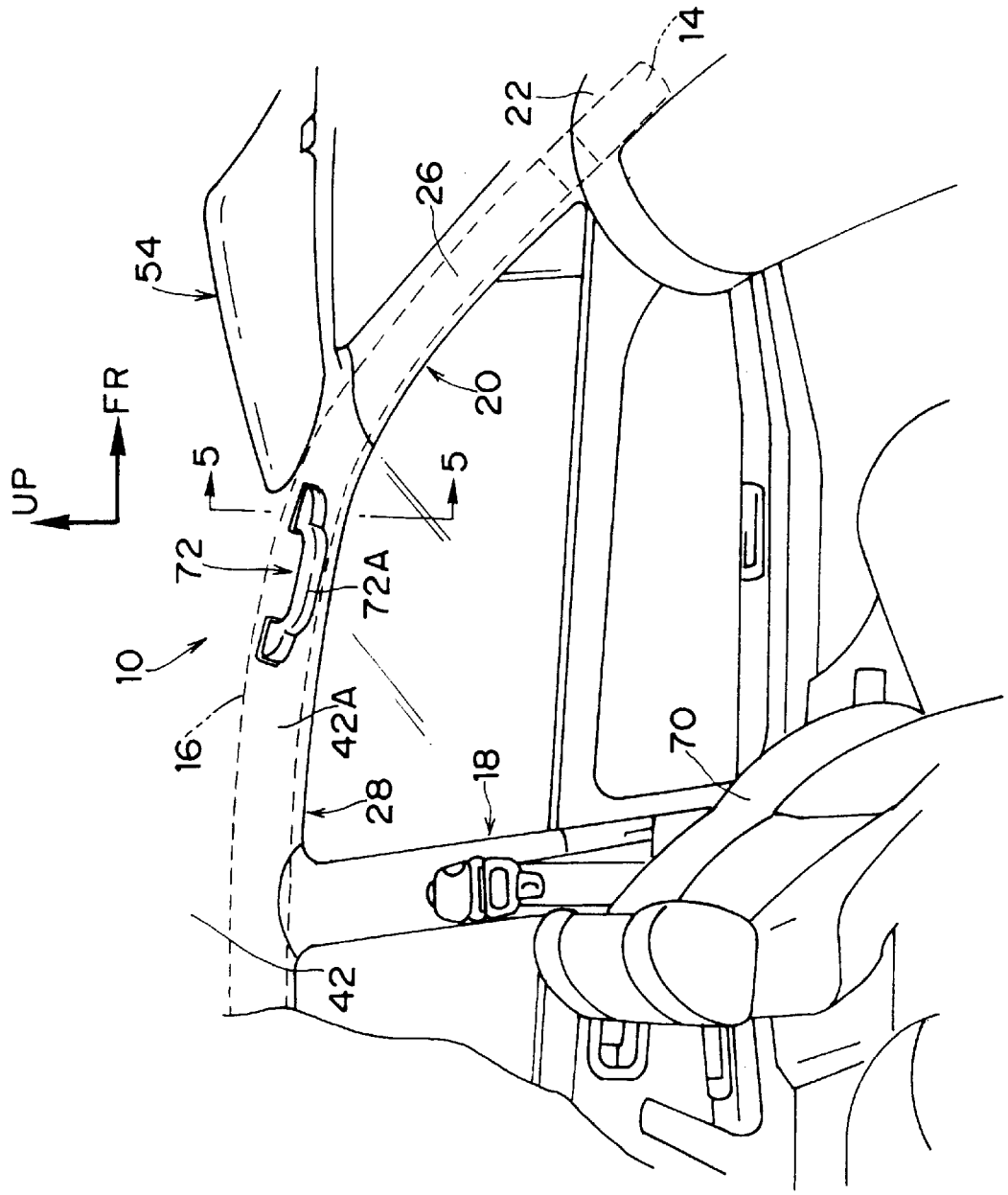
FIG. 6 is a side view which schematically shows an interior-side surface of a vehicle at a front passenger seat side, to which an interior equipment mounting structure for a vehicle incorporating a head-protecting air bag body according to a second embodiment of the present invention is applied.

With reference to FIGS. 5 and 6, a description will be hereinafter given of a second embodiment of an interior equipment mounting structure for a vehicle incorporating a head-protecting air bag body according to the present invention.

The same members as those of the first embodiment will be denoted by the same reference numerals, and description thereof will be omitted.

As shown in FIG. 6, in the present second embodiment, the head-protecting air bag device 10 is disposed along the front pillar 20 and the roof side rail 28 at the side of a front passenger seat 70. An assist grip 72, which serves as roof head lining deformation limiting means and which is used as interior equipment of the roof side rail portion, is disposed at an intermediate position between a portion where the roof side rail 28 is connected to the front pillar 20 and a portion where the roof side rail 28 is connected to the center pillar 18.

As shown in FIG. 5, a bracket 76 having a substantially hat-shaped cross-sectional configuration and serving as an energy absorbing member is fixed to the surface of the rail inner panel 40 at an interior side of the vehicle. The plate thickness of the bracket 76 is set to be smaller than that of the rail inner panel 40. A through hole 77 is formed in the rail inner panel 40 at a position which faces the bracket 76.

A concave portion 74 is formed at the vehicle transverse direction outer side portion 42A of the roof head lining 42 (i.e., at a predetermined position at the roof side rail 28) in such a manner as to be recessed toward the roof side rail 28.

The air bag body 16 of the air bag device 10 and the case 50 are accommodated in a space 78 surrounded by the outer end of the roof head lining 42, the rail inner panel 40, and the bracket 76. The air bag body 16 is folded so as to have a rectangular cross-sectional configuration along the line perpendicular to the longitudinal direction of the air bag body, and an upper end portion 16D of the air bag body 16 extends along the bracket 76 and the concave portion 74. Correspondingly, the case 50 for maintaining the shape of the air bag body 16 is also bent into a rectangular shape, and the upper wall portions 50D and 50E which cover the front and rear surfaces of the upper end portion 16D of the air bag body 16 also extend along the bracket 76 and the concave portion 74. Accordingly, when the head of the vehicle occupant secondarily strikes against the assist grip 72 at the time of a side collision of the vehicle, the bracket 76 which has a small plate thickness plastically deforms to allow absorption of energy. At this time, a fastener 80, which will be described later, passes through the through hole 77 formed in the rail inner panel 40 and moves backward toward an interior side of the closed space of the roof side rail 28. A rib may be provided at a position which faces the air bag body 16 (i.e., a position between the upper end of the roof side rail 28 and the roof head lining 42) to absorb energy generated during the secondary colliding of the head of the vehicle occupant at the time of a side collision.

The assist grip 72 made of resin is provided at the concave portion 74 of the roof head lining 42. The assist grip 72 is formed by a grip portion 72A (see FIG. 6) which the vehicle occupant grips, flat plate-shaped mounting portions 72B provided at front and rear ends of the grip portion 72A in the longitudinal direction of the vehicle, and cover portions 72C which cover the mounting portions 72B, respectively.

The assist grip 72 is fixed by fasteners 80, each of which is formed by a collar 82, a fixing bolt 84, a washer 86, and a nut 88. More specifically, the cylindrical collar 82 made of resin is fitted with a predetermined position of the concave portion 74 of the roof head lining 42 (i.e., a position coaxial with the through hole 77 of the rail inner panel 40). Each mounting portion 72B of the assist grip 72 is fixed to the bracket 76 by placing the mounting portion 72B at the vehicle interior side end of the collar 82, inserting the fixing bolt 84, which passes through the washer 86, into the collar 82, and screwing the fixing bolt 84 with the nut 88.

In the present second embodiment, the upper end portion 16D of the air bag body 16 and the upper wall portions 50D and 50E of the case 50 are disposed in a state of contacting one another (i.e., in a state of being nipped) between the vehicle exterior side surface of the concave portion 74 of the roof head lining 42 and the vehicle interior side surface of the bracket 76. The upper end portion 16D of the air bag body 16 and the upper wall portions 50D and 50E of the case 50 are, together with the assist grip 72, fastened together by the fasteners 80 for fixing the assist grip 72. The assist grip 72 is fixed at two positions (one at the front side and one at the rear side of the assist grip 72), and the upper end portion 16D of the air bag body 16 and the upper wall portions 50D and 50E of the case 50 are fastened together at both fixing points.

Further, a cushion 90 made of resin is disposed between the collar 82 and the concave portion 74 of the roof head lining 42. A seating 92 is provided around the cushion 90 at the roof head lining 42 side. The seating 92 is made of metal so as to have a high rigidity, and is nipped between the outer periphery of the cushion 90 and the roof head lining 42.

The structure in which the air bag body 16 and the upper wall portions 50D and 50E of the case 50 are tightened together is applied similarly to an assist grip disposed at the rear side of the vehicle. Further, regions of the air bag body 16 other than the portions where the assist grip 72 is disposed are fixed at suitable intervals by fasteners exclusively used for the air bag.

Next, the operation and effects of the present second embodiment will be described.

When a side-collision load of a predetermined value or more acts on the side portion of the vehicle body, the occurrence of a side-surface collision is detected by the sensor 12. For this reason, the inflator 14 operates and ejects a predetermined amount of gas. As a result, the air bag body 16 starts to expand, and due to the swelling pressure at this time, the case 50 is broken at the corner portion 50A so as to allow unfolding of the air bag body 16. The inflated air bag body 16 further expands similarly to a curtain to below the roof side rail 28 while pushing open the front pillar garnish 26 and the vehicle transverse direction outer side portion 42A of the roof head lining 42. As a result, the air bag body 16 is interposed between the side portion of the vehicle body and the head of the vehicle occupant to protect the head of the vehicle occupant.

In the present second embodiment, the mounting portions 72B of the assist grip 72 serving as the roof head lining deformation limiting means restrict deformation of the vehicle transverse direction outer side portion 42A of the roof head lining 42 at this time so as to prevent the roof head lining 42 from interfering with the sun visor 54 disposed near the roof head lining 42. In this case, even if the outer side portion 42A of the roof head lining 42 were to interfere with the sun visor 54 disposed near the roof head lining 42, impact load acting on the sun visor 54 would be significantly lessened. For this reason, breakage of the sun visor 54 can be reduced and the sun visor 54 can also be prevented from falling off.

The present second embodiment provides the seating 92 having high rigidity around the cushion 90 for fixing the assist grip 72 to the vehicle body. Therefore, concentration of load caused by deformation of the outer side portion 42A of the roof head lining 42 during the expansion of the air bag body is received by the high-rigidity seating 92 so as to prevent transmission of load to the cushion 90 made of resin. As a result, cracking or falling off of the cushion 90 can be prevented.

Further, in the present embodiment, when the head of the vehicle occupant secondarily strikes against the assist grip 72 at the time of side collision of the vehicle, the bracket 76 formed to have a relatively small plate thickness plastically deforms, and the fastener 80 passes through the through hole 77 formed in the rail inner panel 40 and moves backward toward the interior of the closed space of the roof side rail 28, thereby allowing absorption of energy. For this reason, even if the head of the vehicle occupant abuts against the assist grip 72 at the time of collision of the vehicle, the impact applied to the head of the vehicle occupant can be lessened.

Moreover, in the present embodiment, the assist grip 72 is used as the roof head lining deformation limiting means, and therefore, it is not necessary to provide a special roof head lining deformation limiting means particularly used for that purpose. A reduction in cost can be achieved accordingly.

Figure 7:
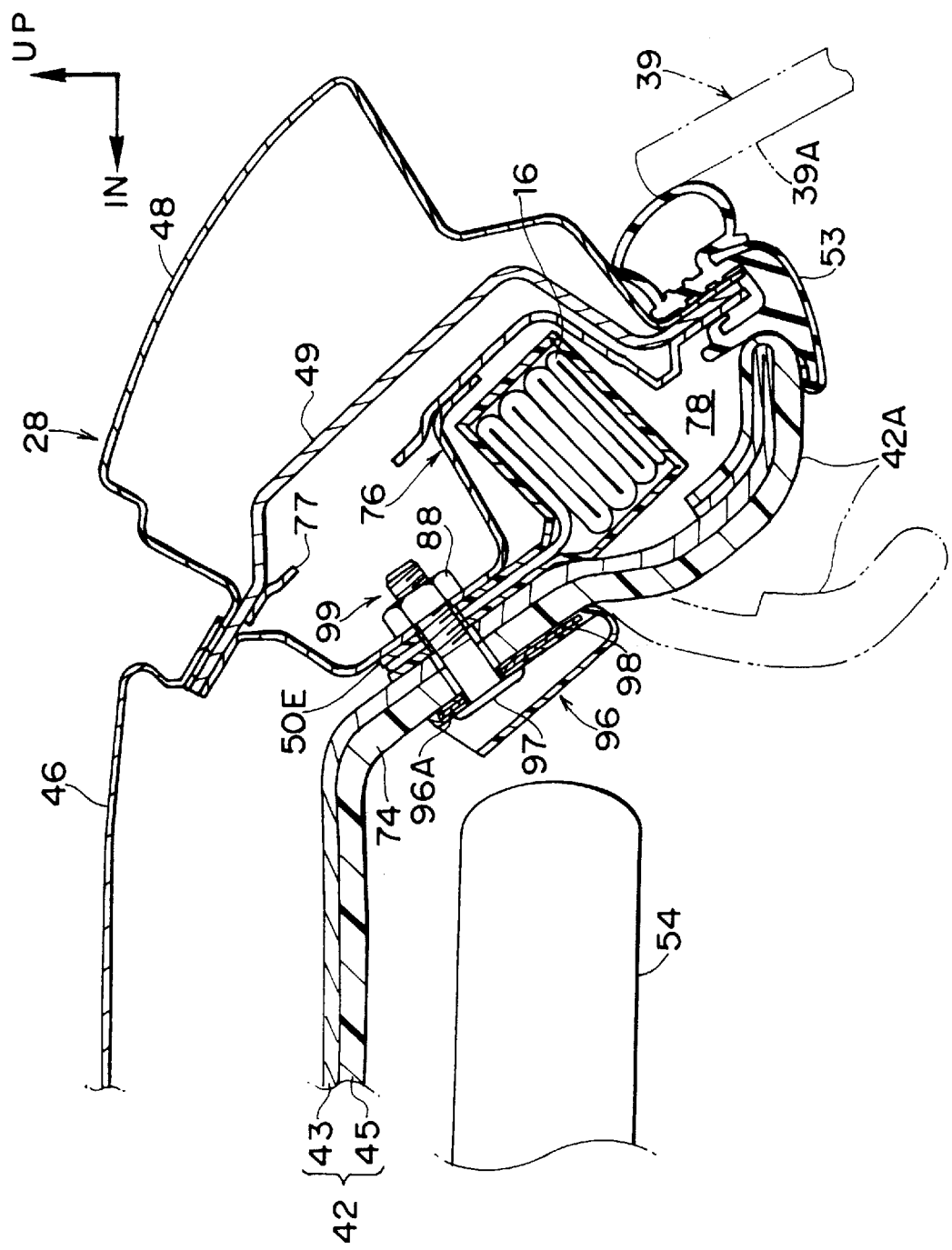
FIG. 7 is an enlarged cross-sectional view taken along line 7—7 in FIG. 8.
Figure 8:
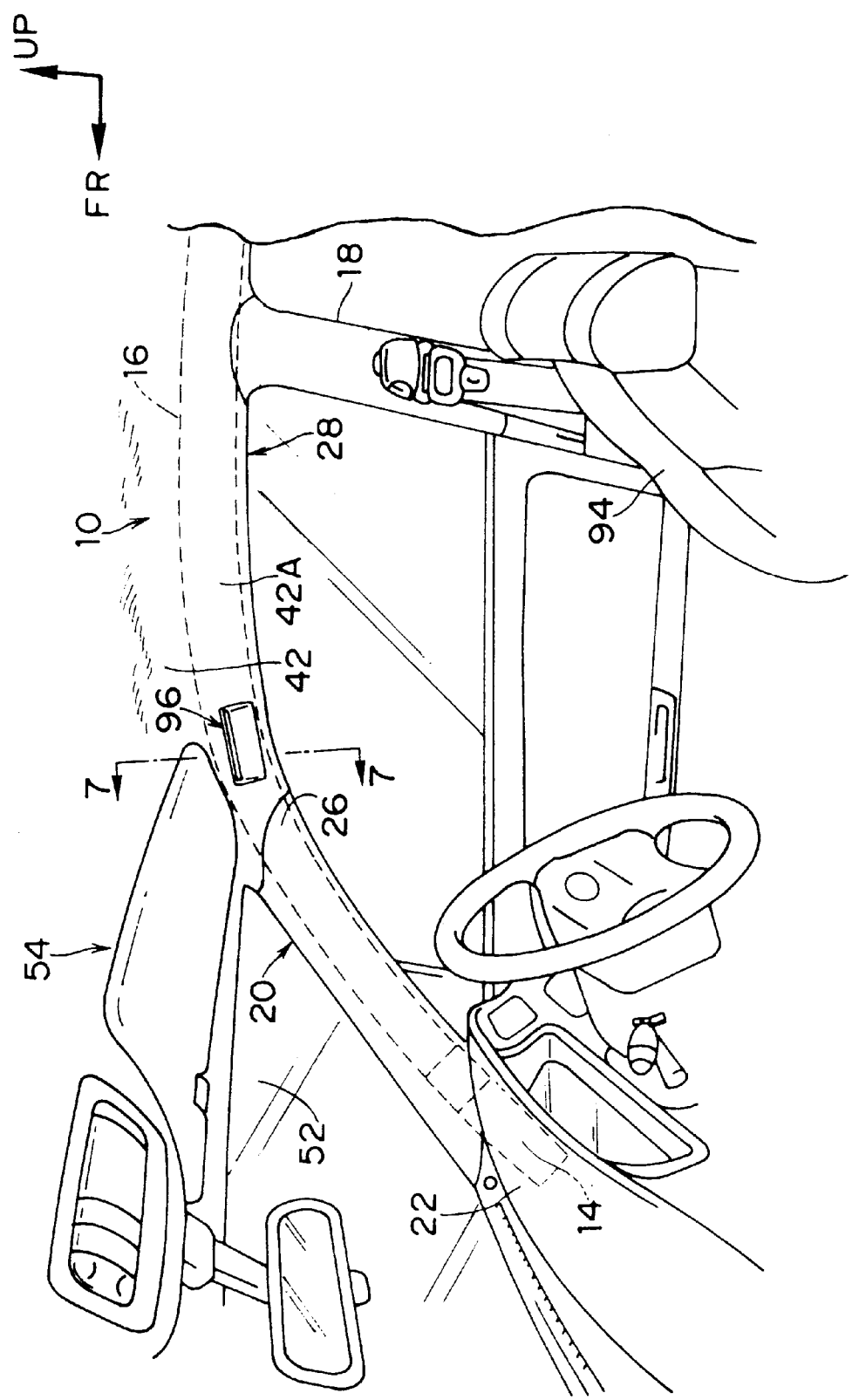
FIG. 8 a side view which schematically shows an interior-side surface of a vehicle at a driver's seat side, to which an interior equipment mounting structure for a vehicle incorporating a head-protecting air bag body according to a third embodiment of the present invention is applied.
Figure 9:
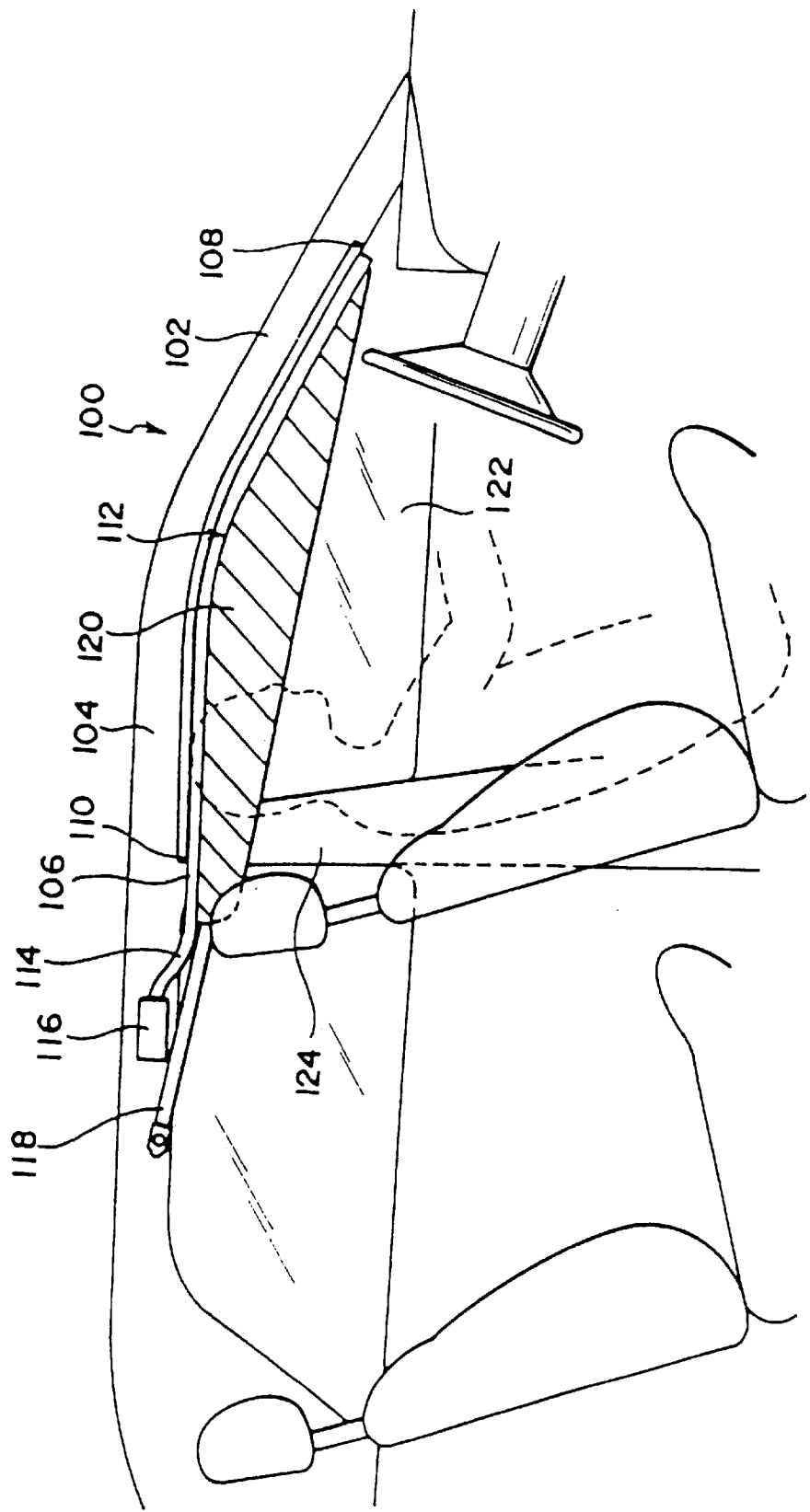
FIG. 9 is a side view which schematically shows a state in which expansion of an air bag body is completed in a conventional head-protecting air bag device.

With reference to FIGS. 7 and 8, a description will be hereinafter given of a third embodiment of an interior equipment mounting structure for a vehicle incorporating a head-protecting air bag body.

The same members as those of the second embodiment will be denoted by the same reference numerals, and description thereof will be omitted.

As shown in FIG. 8, in the present third embodiment, the head-protecting air bag device 10 is disposed along the front pillar 20 and the roof side rail 28 at the side of a driver's seat 94. A card holder 96, which serves as the roof head lining deformation limiting means and which is used as interior equipment of the roof side rail portion, is disposed at an intermediate position between a portion where the roof side rail 28 is connected to the front pillar 20 and a portion where the roof side rail 28 is connected to the center pillar 18.

As shown in FIG. 7, the card holder 96 made of resin is disposed at the concave portion 74 of the roof head lining 42 and is formed to have a U-shaped cross-sectional configuration. An insert 98 is embedded in a mounting portion 96A of the card holder 96. The card holder 96 is fixed by a fastener 99 which is formed by a fixing screw 97 and a nut 88. More specifically, the mounting portion 96A of the card holder 96 abuts against a predetermined position of the concave portion 74 of the roof head lining 42 (i.e., a position coaxial with the through hole 77 of the rail inner panel 40), and the screw 97 passes through a through hole formed in the mounting portion 96A. In this state, when the fixing screw 97 is screwed into the nut 88, the mounting portion 96A of the card holder 96 is fixed to the bracket 76.

In the present embodiment, the upper end portion 16D of the air bag body 16 and the upper wall portions 50D and 50E of the case 50 are, together with the card holder 96, fastened together by the fastener 99 for fixing the card holder 96. The card holder 96 is fixed at two places, one at the front side and one at the rear side, of the card holder 96 in the longitudinal direction of the vehicle. The upper end portion 16D of the air bag body 16 and the upper wall portions 50D and 50E of the case 50 are fastened together at both fixing points. Further, the insert 98 is made of a metallic material such as iron and therefore has high rigidity.

Next, the operation and effects of the present third embodiment will be described.

When a side-collision load acts on the side portion of the vehicle body, the occurrence of a side-surface collision is detected by the sensor 12. For this reason, the inflator 14 operates and ejects a predetermined amount of gas. As a result, the air bag body 16 starts to expand, and due to the swelling pressure thereof, the case 50 is broken at the corner portion 50A so as to allow the air bag to unfold. The inflated air bag body 16 further expands similarly to a curtain to beneath the roof side rail 28 while pushing open the front pillar garnish 26 and the vehicle transverse direction outer side portion 42A of the roof head lining 42. As a result, the air bag body 16 is interposed between the side portion of the vehicle body and the head of the vehicle occupant so as to protect the head of the vehicle occupant.

At this time, in the present embodiment, the mounting portion 96A of the card holder 96 serving as the roof head lining deformation limiting means restricts deformation of the outer side portion 42A of the roof head lining 42 so as to prevent the roof head lining 42 from interfering with the sun visor 54 positioned near the roof head lining 42. In this case, even if the outer side portion 42A of the roof head lining 42 were to interfere with the sun visor 54 positioned near the roof head lining 42, impact load acting on the sun visor 54 would be significantly lessened. For this reason, damage caused to the sun visor 54 can be lessened, and the sun visor 54 can also be prevented from falling off.

In the present third embodiment, the high-rigidity insert 98 is embedded in the mounting portion 96A which fixes the card holder 96 to the vehicle body. Therefore, concentration of load caused by deformation of the outer side portion 42A of the roof head lining 42 during expansion of the air bag body is received by the high-rigidity insert 98, and thus cracking and falling off of the mounting portion 96A of the card holder 96 can be prevented.

Further, in the present embodiment, when the head of the vehicle occupant secondarily strikes against the card holder 96 at the time of a side collision of the vehicle, the bracket 76 formed to have a relatively small plate thickness plastically deforms, and the fastener 99 passes through the through hole 77 formed in the rail inner panel 40 and moves backward toward the interior of the closed space of the roof side rail 28, thereby allowing absorption of energy. For this reason, even if the head of the vehicle occupant hits the card holder 96 at the time of a collision of the vehicle, impact applied to the head of the vehicle occupant can be lessened.

Moreover, in the present third embodiment, the card holder 96 is used as the roof head lining deformation limiting means, and therefore, it is not necessary to provide a special roof head lining deformation limiting means exclusively used for this purpose. A reduction in cost can be achieved accordingly.

Although the present invention has been described in detail as related to specific embodiments, it will be understood by those skilled in the art that the present invention is not limited to these specific embodiments thereof and other various modifications may be made within the scope of the present invention. For example, in the first embodiment, in the sun visor 54, the frame 68 of the overhang portion 66 and the frame 57 of the main body portion 64 are fixed together at the two welding portions Y1 and Y2, but the number of these welding portions is not limited to two. Further, these frames may be connected by other means such as bonding or engagement in place of welding. Moreover, a structure in which plate-shaped inserts are connected together may be used in place of the frames 68 and 57.

Further, in the second and third embodiments, although the bracket 76 having a plate thickness smaller than that of the rail inner panel 40 and having a substantially hat-shaped cross-sectional configuration is used as the energy absorbing member, other energy absorbing members may be used in place of the bracket 76.

Moreover, in each of the above-described embodiments, the structure in which the folded air bag body 16 is accommodated within the case 50 is employed. However, the case 50 is not necessarily required, and the air bag body 16 may be maintained in a folded state in such a manner that the folded air bag body 16 is partially wrapped by an easily-broken wrapping material or partially held temporarily by a tape-shaped hook-and-loop fastener.

What is claimed is:

1. An interior equipment mounting structure for a vehicle incorporating a head-protecting air bag body which expands in a region from a pillar to a roof side rail, comprising:

roof head lining deformation limiting means which is provided at the roof side rail and at the time of expansion of the air bag body, restricts deformation of a roof head lining to reduce impact load acting inwardly in a vehicle transverse direction on an interior equipment disposed in the vicinity of the roof head lining, the interior equipment being disposed at a position further inwardly in a vehicle transverse direction than the air bag body before expansion.

2. An interior equipment mounting structure for a vehicle incorporating a head-protecting air bag body according to claim 1, wherein said roof head lining deformation limiting means is an interior equipment of the roof side rail, which interior equipment is disposed at an intermediate portion of the roof side rail between a portion where the roof side rail is connected to a front pillar and a portion where the roof side rail is connected to a center pillar.

3. An interior equipment mounting structure for a vehicle incorporating a head-protecting air bag body according to claim 2, wherein the interior equipment of the roof side rail is fixed to an energy absorbing member disposed at the roof side rail, the energy absorbing member being associated with a corresponding energy absorption space.

4. An interior equipment mounting structure for a vehicle incorporating a head-protecting air bag body according to claim 3, wherein the energy absorbing member is a metal bracket disposed at a vehicle transverse direction inner side of the roof side rail.

5. An interior equipment mounting structure for a vehicle incorporating a head-protecting air bag body according to claim 4, wherein the roof side rail has a closed cross-sectional configuration formed by a rail outer panel, a rail inner panel, and a rail reinforcement interposed between the rail outer panel and the rail inner panel, and two ends of the metal bracket are fixed to the rail inner panel, and the interior equipment of the roof side rail is fixed at an intermediate portion of the metal bracket by a fastener, and a hole is formed in the rail inner panel at a position corresponding to the fastener so as to allow the fastener to move toward an outer side of the vehicle.

6. An interior equipment mounting structure for a vehicle incorporating a head-protecting air bag body according to claim 4, wherein the metal bracket includes two flanges, a top portion, and inclined walls that connect the flanges to the top portion.

7. An interior equipment mounting structure for a vehicle incorporating a head-protecting air bag body according to claim 2, wherein the interior equipment of the roof side rail is an assist grip.

8. An interior equipment mounting structure for a vehicle incorporating a head-protecting air bag body according to claim 7, wherein a high rigidity seating is provided around a cushion which is made of resin and used to fix the assist grip to a vehicle body.

9. An interior equipment mounting structure for a vehicle incorporating a head-protecting air bag body according to claim 2, wherein the interior equipment of the roof side rail is a card holder.

10. An interior equipment mounting structure for a vehicle incorporating a head-protecting air bag body according to claim 9, wherein the card holder is a resin molded product and includes a high rigidity insert.

11. An interior equipment mounting structure for a vehicle incorporating a head-protecting air bag body according to claim 2, wherein the interior equipment of the roof side rail includes a card holder provided at a driver's seat side of a vehicle.

12. An interior equipment mounting structure for a vehicle incorporating a head-protecting air bag body according to claim 2, wherein the interior equipment of the roof side rail includes an assist grip provided at a front passenger's seat side of the vehicle.

13. A vehicle structure for incorporating in the vicinity of a sun visor a head-protecting air bag which expands in a region from a front pillar to a roof side rail, the sun visor being provided to be movable from an accommodated state, in which the sun visor is disposed along a vehicle transverse direction and near to a front end of a roof head lining and substantially parallel to the roof head lining, to at least one predetermined position for use, said vehicle structure comprising:

an air bag body which is mounted to the roof side rail, and at the time of expanding, deforms the roof head lining toward an interior side of the vehicle and further expands toward the interior side of the vehicle; and roof head lining deformation limiting means which is mounted to the roof side rail at a position between the sun visor and said air bag body and limits deformation of the roof head lining to limit application of expansion force of the air bag body to the sun visor.

14. A vehicle structure according to claim 13, wherein the roof head lining deformation limiting means includes a card holder provided at a driver's seat side of a vehicle.

15. A vehicle structure according to claim 13, wherein the roof head lining deformation limiting means includes an assist grip provided at a front passenger's seat side of the vehicle.

16. An interior equipment mounting structure for a vehicle incorporating a head-protecting air bag body that expands through a roof head lining positioned in a region from a pillar to a roof side rail, comprising:

a roof head lining structure provided adjacent the roof side rail and between the roof head lining and an interior equipment of the vehicle, the roof head lining structure restricting deformation of the roof head lining during expansion of the air bag body to reduce an impact load acting inwardly in a vehicle transverse direction on the interior equipment, the interior equipment being disposed adjacent the roof head lining at a position further inwardly in the vehicle transverse direction than the air bag body before expansion.

17. An interior equipment mounting structure for a vehicle incorporating a head-protecting air bag body according to claim 16, wherein the roof head lining structure comprises a card holder mounted to the roof side rail and provided at a driver's seat side of the vehicle.

18. An interior equipment mounting structure for a vehicle incorporating a head-protecting air bag body according to claim 16, wherein the roof head lining structure comprises an assist grip mounted to the roof side rail and provided at a front passenger's seat side of the vehicle.

* * * * *